July 4, 1967   L. P. BRISSETTE ETAL   3,328,918
VEHICLE BODY
Original Filed March 25, 1964   2 Sheets-Sheet 1

INVENTORS
Lawrence P. Brissette
BY & James D. Leslie
Herbert Furman
ATTORNEY

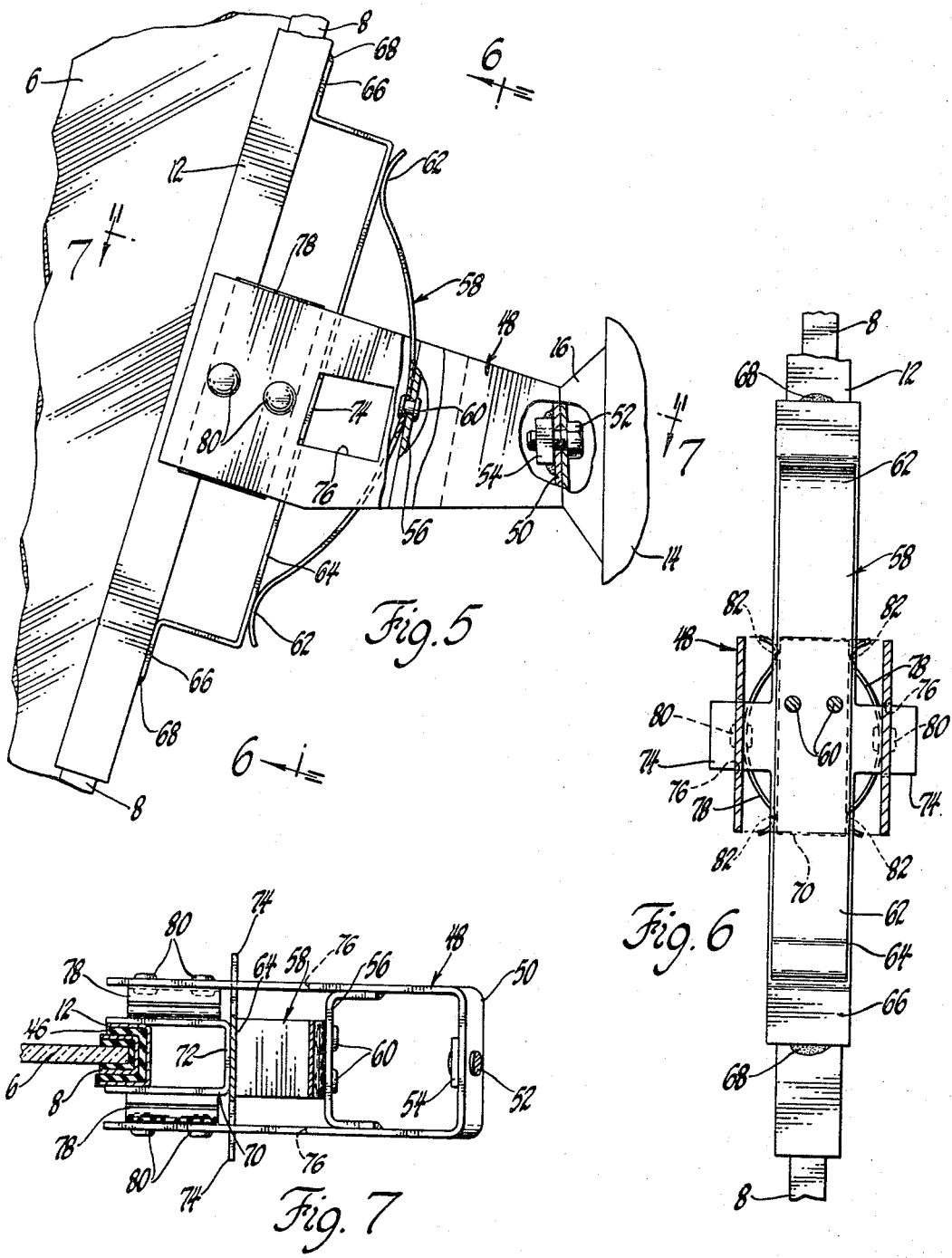

United States Patent Office 3,328,918
Patented July 4, 1967

3,328,918
VEHICLE BODY
Lawrence P. Brissette, Utica, and James D. Leslie, Birmingham, Mich., assignors to General Motors Corporation, Detroit, Mich., a corporation of Delaware
Original application Mar. 25, 1964, Ser. No. 354,655, now Patent No. 3,273,286, dated Sept. 20, 1966. Divided and this application Apr. 29, 1966, Ser. No. 546,343
4 Claims. (Cl. 49—415)

This invention relates to vehicle body construction, and more particularly to the supporting and guiding of the vertically slidable glass windows in either the body walls or in the vehicle doors. This application is a division of S.N. 354,655, filed Mar. 25, 1964 now Patent 3,273,286, issued Sept. 20, 1966.

In present day body construction, it is quite common for the window glass, in order to conform to the shape of the body, to have to slide upwardly or downwardly in an inclined path, or in some cases the window glass has to be of curved shape, and in either of these situations, difficulties are sometimes encountered in inserting the glass in the glass run channels when the body is being assembled, or in guiding the glass when it is being raised or lowered, so that there will be no binding action which would increase the amount of friction present.

It is therefore an object of the invention to provide a resilient or yielding supporting means for one of the glass run channels which will permit such channel to have a limited amount of movement when the window is being inserted in it during assembly, or is being raised or lowered during normal operation, in order that the glass run channel may be free to shift its position as necessary during such movement to align itself properly with the window glass to avoid any binding action between the two elements, so that the window may freely slide in the glass run channels at all times.

This is particularly desirable when the window is to be raised or lowered with power operated regulators, since in such installations any binding action which produces excessive amounts of friction may result in failure of the power operating mechanism to properly raise or lower the window.

Other objects of the invention will be apparent upon reference to the following description and accompanying drawings, in which:

FIGURE 5 is a view similar to FIGURE 2, but showing a modified form of the invention;

FIGURE 6 is a sectional view, taken on the line 6—6 of FIGURE 5; and

FIGURE 7 is a sectional view, taken on the line 7—7 of FIGURE 5.

Figure 1:
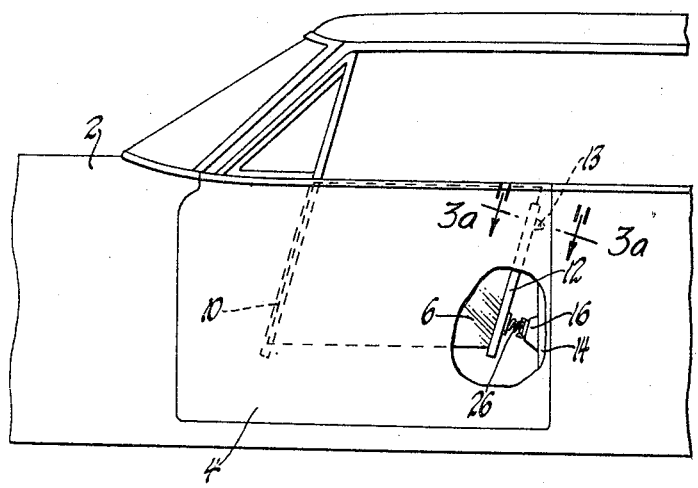
FIGURE 1 is a fragmentary side view of a vehicle body, with portions broken away to show the invention associated therewith.

Referring to FIGURE 1, 2 is a conventional vehicle body, having a door 4 within which is mounted a window consisting of a glass 6 having a frame 8 secured around its edges. Since the window is adapted to be raised or lowered in the door, frame 8 is slidably mounted in a front guide or glass run channel 10 and in a rear guide or glass run channel 12. At its upper end, the rear glass run channel is secured to the door by any suitable form of pivotal support 13 which will permit the lower end of the glass run channel to move in either a fore-and-aft direction, or an in-and-out direction with respect to the body. FIGURE 3a shows a suitable pivotal support which generally comprises an angle bracket secured to the upper end of the channel 12 and pivotally and slidably mounted on a bolt which is mounted on the inner panel of the door 4.

Figure 2:
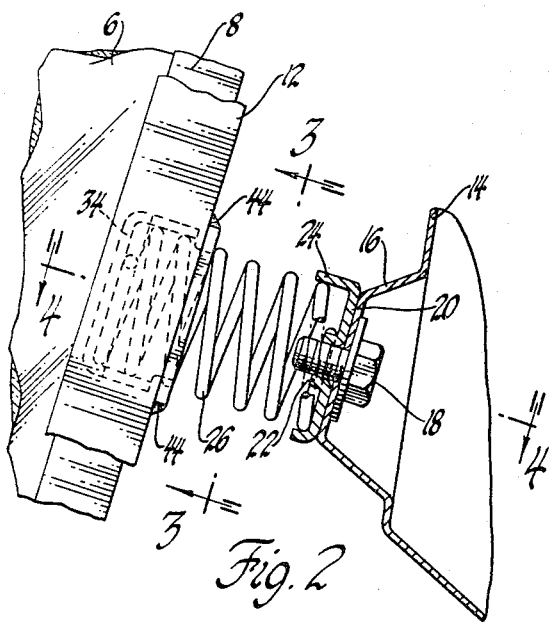
FIGURE 2 is an enlarged view of the portion which is broken away in FIGURE 1.
Figure 3:
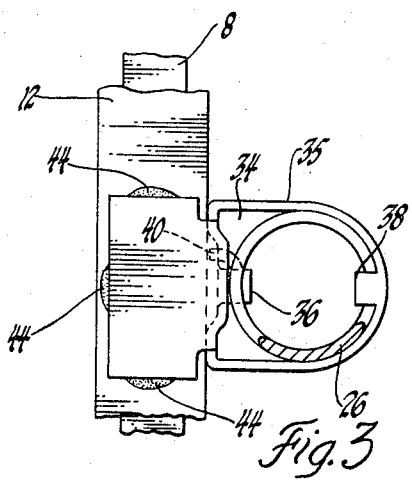
FIGURE 3 is a sectional view, taken on the line 3—3 of FIGURE 2.
Figure 4:
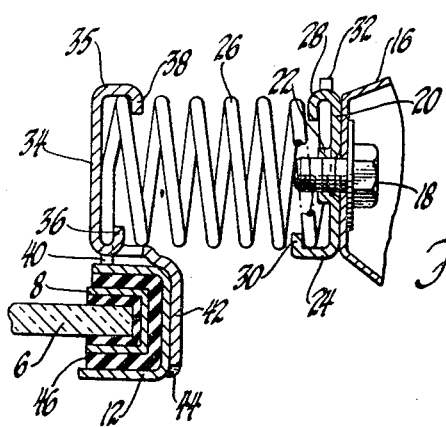
FIGURE 4 is a sectional view, taken on the line 4—4 of FIGURE 2.
Figure 3A:
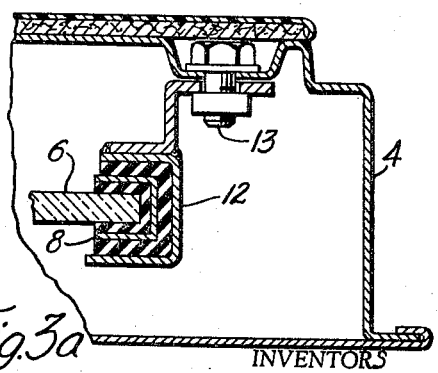
FIGURE 3a is an enlarged sectional view taken generally along line 3a—3a of FIGURE 1.

One form of resilient or yielding supporting means for the glass guide channel is shown in FIGURES 2 to 4, wherein 14 is a portion of the door frame and 16 is a boss formed thereon. Secured to the boss by means of a bolt 18 is a spring seat 20, the bolt being threaded into the central portion 22 of the spring seat. 24 is a flange which is provided on the spring seat, and a coil spring 26 is located within the flange 24, portions 28 and 30 of the flange being bent over the end coil of the spring to hold it in the spring seat. The end 32 of the spring bears against the portion 28 to prevent the spring from turning with respect to the spring seat.

The other end of the spring 26 is seated in a support member 34 which has a flange 35 formed on it having portions 36 and 38 bent over the end coil of the spring to hold it in place therein, the end 40 of the spring bearing against the portion 36 to prevent turning of the spring with respect to the support member.

As best shown in FIGURE 4, the other end of the support member is bent to form a portion 42 which is welded as at 44 to the rear glass run channel 12, in which the window frame is slidably supported, there being suitable resilient material 46 secured in the glass run channel for the window frame to slide in with a minimum of friction.

It will be readily seen that with this resilient support, the rear glass run channel is free to move or float a limited amount in either fore-and-aft or in-and-out directions to permit the window to assume a position wherein it will be in proper alignment with the glass run channel and there will be no possibility of there being any binding action developing between it and the channel as it slides up or down in the latter. This is of importance not only when the window glass is being assembled in the glass run channels during manufacture of the vehicle body, to compensate for slight variations in the shape or dimensions of the parts, but also results in an easier operating window when the latter is being raised or lowered, due to the absence of any binding action between the window and the glass run channel.

In the modified form of the invention showed in FIGURES 5 to 7, a U-shaped frame 48 has its central portion 50 secured to the boss 16 on the door frame 14 by a bolt 52 which is threaded into a nut 54 welded to the central portion 50. Secured inside the frame 48 by welding is a bracket 56 to which the central portion of a leaf spring 58 is secured by rivets 60. The ends 62 of the spring 58 bear against a strap or bracket 64 which has its ends 66 welded to the glass run channel 12 at 68.

70 is a U-shaped striker member, the ends of which straddle and are secured to the glass run channel, and the central portion 72 of which bears against the bracket 64. The latter has projections 74 which extend outwardly through slots 76 formed in the legs of the U-shaped frame 48, to serve to guide the striker member as it tends to move sidewise with respect to the U-shaped frame 48. A leaf spring 78 is secured to each leg of the U-shaped frame by rivets 80, the free ends 82 of the springs 78 bearing against the striker member 70.

In this form of the invention, self-aligning movement of the glass run channel 12 is permitted by the action of the leaf springs, the leaf spring 58 becoming compressed should the glass run channel tend to move in an aft direction, and one or the other of the leaf springs 8 becoming compressed to permit in-or-out movement with respect to the door. It will be readily seen that this type of mounting will permit the same floating movement which will enable the glass run channel to adapt itself to whatever position is necessary in order to align itself properly with the window when the latter is being assembled in position in the door, or when the window is being raised or lowered during normal operation.

While specific embodiments of the invention have been shown and described, it will be understood that various changes in design or arrangement of the parts may be made without departing from the spirit and scope of the appended claims.

We claim:

1. In a vehicle body having a window opening therein and a window for closing said opening, the combination comprising, guide means mounted on said body for guiding one edge portion of said window along a predetermined path upon movement of said window between open and closed positions, an elongated guide member for guiding an opposite edge portion of the window, means pivotally mounting said guide member adjacent one end thereof to said body, said window, upon movement thereof, moving said guide member relative to said pivot means longitudinally of the path of movement of the window, laterally of the path of movement of the window, or both longitudinally and laterally of the path of movement of the window as required to align and conform said guide member with said window during movement thereof, and resilient means interconnecting said guide member adjacent an opposite end thereof and said body and providing a floating connection therebetween, said resilient means including first spring means biasing said guide member longitudinally of the path of movement of the window and second spring means biasing said guide member laterally of the path of movement of the window, said first and second spring means locating said guide member in a predetermined position both laterally and longitudinally of the path of movement of the window.

2. The combination recited in claim 1 including means limiting the maximum extent of movement of said guide member both laterally and longitudinally of the path of movement of the window.

3. The combination recited in claim 2 wherein said limiting means locates said guide member against the action of said first spring means.

4. The combination recited in claim 1 wherein said spring means include leaf spring members engaging said guide member at spaced locations, and means mounting said spring members on said body.

References Cited

UNITED STATES PATENTS

| 1,370,890 | 3/1921 | Gusy | 49—436 X |
| 2,200,548 | 5/1940 | Grady et al. | 49—436 X |
| 2,775,796 | 1/1957 | Passis | 49—415 |

DAVID J. WILLIAMOWSKY, *Primary Examiner.*

HARRISON R. MOSELEY, *Examiner.*

A. I. BREIER, *Assistant Examiner.*